(12) United States Patent
Wu

(10) Patent No.: US 11,706,856 B2
(45) Date of Patent: Jul. 18, 2023

(54) BAND-PASS FILTERING ADAPTIVE RESPONSE METHOD AND SYSTEM FOR MUSIC LAMP STRIP

(71) Applicant: Shenzhen Glocusent Technology Co., Ltd., Guangdong (CN)

(72) Inventor: Manchuan Wu, Guangdong (CN)

(73) Assignee: Shenzhen Glocusent Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/747,809

(22) Filed: May 18, 2022

(65) Prior Publication Data

US 2023/0011897 A1 Jan. 12, 2023

(30) Foreign Application Priority Data

Jul. 7, 2021 (CN) .......................... 202110767469.8

(51) Int. Cl.
| | | |
|---|---|---|
| *H05B 47/105* | (2020.01) | |
| *H05B 45/20* | (2020.01) | |
| *H05B 45/10* | (2020.01) | |
| *G10H 1/00* | (2006.01) | |
| *H04R 3/04* | (2006.01) | |

(52) U.S. Cl.
CPC ......... *H05B 47/105* (2020.01); *G10H 1/0008* (2013.01); *H04R 3/04* (2013.01); *H05B 45/10* (2020.01); *H05B 45/20* (2020.01); *G10H 2210/071* (2013.01); *G10H 2210/076* (2013.01)

(58) Field of Classification Search
CPC ........... G10H 1/0008; G10H 2210/071; G10H 2210/076; G10L 19/26; H04R 3/04; H05B 45/10; H05B 45/20; H05B 47/105; H05B 47/165; Y02B 20/40
See application file for complete search history.

(56) References Cited

U.S. PATENT DOCUMENTS

| | | | | |
|---|---|---|---|---|
| 11,240,609 | B2 * | 2/2022 | Dehghani | G10H 1/125 |
| 2018/0061438 | A1 * | 3/2018 | Love | G06F 3/167 |
| 2019/0182932 | A1 * | 6/2019 | Zhang | H03F 3/68 |
| 2019/0394578 | A1 * | 12/2019 | Dehghani | G10L 25/51 |
| 2020/0007978 | A1 * | 1/2020 | Ralph | H04R 1/2807 |
| 2020/0211517 | A1 * | 7/2020 | Tsutaki | G10H 1/125 |
| 2021/0352787 | A1 * | 11/2021 | Cremer | F21S 10/02 |
| 2022/0418064 | A1 * | 12/2022 | Cremer | H05B 47/165 |

FOREIGN PATENT DOCUMENTS

KR 20140135321 A * 11/2014

* cited by examiner

*Primary Examiner* — Raymond R Chai

(57) ABSTRACT

The present invention provides a band-pass filtering adaptive response method and system for music lamp strip. The method comprises the following steps: Step 1: obtaining sound data acquired by a microphone in real time, and sequentially filtering the obtained sound data through a low-pass filter; Step 2: classifying the filtered sound data by a volume classifier, so as to classify the continuous changes of sound into a number of discrete classifications; Step 3: determining a BPM of the sound data according to a classification result of the volume classifier; Step 4: determining a acquisition frequency of MCU according to the determined BPM; Step 5: acquiring the classification result of the volume classifier by MCU according to the determined acquisition frequency; Step 6: controlling color change and/or brightness change of LED lamp on the music lamp strip according to the classification result acquired by MCU.

9 Claims, 2 Drawing Sheets

BAND-PASS FILTERING ADAPTIVE RESPONSE METHOD AND SYSTEM FOR MUSIC LAMP STRIP

CROSS-REFERENCE TO RELATED APPLICATION

This application claims priority from the Chinese patent application 202110767469.8 filed Jul. 7, 2021, the content of which is incorporated herein in the entirety by reference.

FIELD OF TECHNOLOGY

The present invention relates to the technical field of music lamp strip response, in particular, to a band-pass filtering adaptive response method and system for music lamp strip.

BACKGROUND

In recent years, car music lamp strips are very popular in China and Europe and the United States. Many brand cars have their own music lamp strips, and the music lamp strips can change color with the rhythm of music to adjust the atmosphere of the car, thereby reducing the fatigue in the process of driving, which is loved by the majority of consumers.

However, for the existing music lamp strips, the change of the LED lamp is adjusted by the change of volume, but it doesn't match the rhythm of the music, resulting in poor user experience.

SUMMARY

In view of the deficiency of the prior arts, the present invention provides a band-pass filtering adaptive response method and system for music lamp strip, which can accurately control the color change and/or brightness change of the LED lamp according to a rhythm of music, providing better consumer experience.

In order to achieve the above purposes, the present invention discloses a band-pass filtering adaptive response method and system for music lamp strip, comprising following steps:

Step 1: obtaining sound data acquired by a microphone in real time, and sequentially filtering the obtained sound data through a low-pass filter;

Step 2: classifying the filtered sound data by a volume classifier, so as to classify the continuous changes of sound into a number of discrete classifications;

Step 3: determining a BPM of the sound data according to a classification result of the volume classifier;

Step 4: determining a acquisition frequency of a MCU according to the determined BPM;

Step 5: acquiring the classification result of the volume classifier by the MCU according to the determined acquisition frequency;

Step 6: controlling color change and/or brightness change of LED lamp on the music lamp strip according to the classification result acquired by the MCU.

Further, a cut-off frequency of the low-pass filter is 1 KHz.

Further, in Step 2, classifying the filtered sound data utilizing a softMax function, wherein a mathematical expression of the softMax function is as follows:

$$S_i = e^{V_i} / \sum_{j}^{C} e^{V_j}$$

wherein, $V_i$, represents a output of the classifier, i represents a category index, C represents a total number of classifications, and $S_i$ represents a ratio of a index of a current element to a index sum of all elements, values of j range from 1, 2, 3 ... C.

Further, Step 3 comprises following sub-steps:

Step 301: continuously acquiring the classification result output by the volume classifier for multiple times at a preset collection frequency, and determining a law of music rhythm change of the sound data according to the output classification result;

Step 302: increasing the acquisition frequency for multiple times, and repeating Step 301.

Step 303: determining a rhythm pattern of the sound data according to the law of music rhythm change corresponding to a corresponding acquisition frequency, and selecting a law of music rhythm change most consistent with the determined rhythm pattern; determining the BPM of music data according to a acquisition frequency corresponding to a most consistent law of music rhythm change.

Further, Step 6 comprises following sub-steps:

Step 601: obtaining a value of a current volume classifier and a last volume classifier, and calculating a step value between the value of the current volume classifier and the last volume classifier;

Step 602: controlling the color change and/or the brightness change of the LED lamp on the music lamp according to the step value; wherein, the change of LED lamp color and LED lamp brightness correspond to the corresponding step value respectively.

On the other hand, the present invention also discloses a band-pass filtering adaptive response system for music lamp strip, comprising:

a filtering module, configured to obtain sound data acquired by a microphone in real time, and sequentially filter the obtained sound data through a low-pass filter;

a volume classification module, configured to classify the filtered sound data by a volume classifier so as to classify the continuous changes of sound into a number of discrete classifications;

a BPM determination module, configured to determine a BPM of the sound data according to a classification result of the volume classifier;

a acquisition frequency determination module, configured to determine a acquisition frequency of a MCU according to the determined BPM;

a classification result acquisition module, configured for the MCU to acquire the classification result of the volume classifier according to the determined acquisition frequency;

a lamp strip controlling module, configured to control color change and/or brightness change of LED lamp on the music lamp strip according to the classification result acquired by the MCU.

Further, the volume classification module classifies the filtered sound data utilizing a softMax function, wherein a mathematical expression of the softMax function is as follows:

$$S_i = e^{V_i} / \sum_{j}^{C} e^{V_j}$$

wherein, $V_i$, represents a output of the classifier, i represents a category index, C represents a total number of classifications, and $S_i$ represents a ratio of a index of a current element to a index sum of all elements. Further, the BPM determination module comprises:

a acquisition unit, configured to continuously acquire the classification result output by the volume classifier for multiple times at a preset collection frequency, and determine a law of music rhythm change of the sound data according to the output classification result;

a acquisition frequency setting unit, configured to set a acquisition frequency;

a BPM determination unit, configured to determine a rhythm pattern of the sound data according to the law of music rhythm change corresponding to a corresponding acquisition frequency and select a law of music rhythm change most consistent with the determined rhythm pattern and configured to determine the BPM of music data according to a acquisition frequency corresponding to a most consistent law of music rhythm change.

Further, the lamp strip controlling module comprises:

a step value determination unit, configured to obtain a value of a current volume classifier and a last volume classifier and calculate a step value between the value of the current volume classifier and the last volume classifier;

a lamp strip controlling unit, configured to control the color change and/or the brightness change of the LED lamp on the music lamp according to the step value; wherein, the change of LED lamp color and LED lamp brightness correspond to the corresponding step value respectively.

Compared with the prior art, the present invention has the following advantages: the present invention firstly uses a low-pass filter to remove some noises, such as wind noise, tire sound, human voice, etc., so as to attenuate most of the noise and retain most of the music part. Then the volume classifier is used to classify the acquired sound data in real time and determine the BPM of the sound data so as to determine the acquisition frequency of the MCU according to the BPM. Finally, the present invention control the color change and/or brightness change of LED lamp on the music lamp according to the classification result acquired by the MCU. Because the present invention firstly determines the BPM of the sound data, and then determines the acquisition frequency of the MCU according to the BPM, the changes of the music lamp strip behind can accurately match the rhythm of the music, thereby improving the user experience.

BRIEF DESCRIPTION OF THE DRAWINGS

In order to explain the technical solutions of the embodiments of the present application or the prior art more clearly, the following will briefly introduce the drawings that need to be used in the embodiments of the present application or the prior art. Obviously, the drawings described below are only some embodiments of the present application. For those of ordinary skill in the art, without creative work, other drawings can be obtained based on the drawings.

DESCRIPTION OF THE EMBODIMENTS

The technical solutions in the embodiments of the present invention will be clearly and completely described below with reference to the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative efforts shall fall within the protection scope of the present invention.

Figure 1:
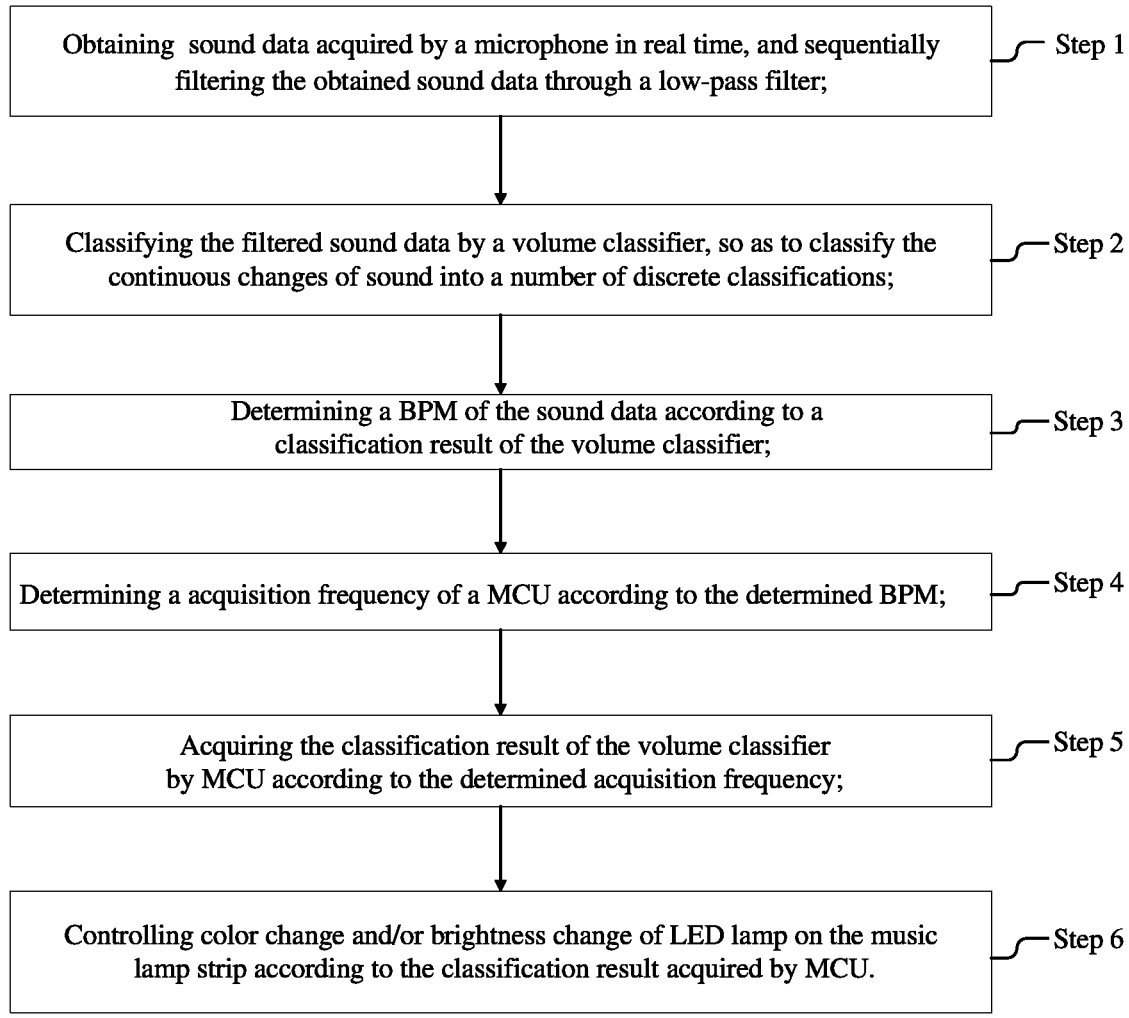
FIG. 1 is a flow chart of the band-pass filtering adaptive response method for music lamp strip provided by this present invention according to a specific embodiment.

As shown in FIG. 1, an embodiment of the present invention discloses a band-pass filtering adaptive response method for music lamp strip, comprising following steps:

Step 1: obtaining sound data acquired by a microphone in real time, and sequentially filtering the obtained sound data through a low-pass filter;

Step 2: classifying the filtered sound data by a volume classifier, so as to classify the continuous changes of sound into a number of discrete classifications;

Step 3: determining a BPM (Beat Per Minute) of the sound data according to a classification result of the volume classifier;

Step 4: determining a acquisition frequency of a MCU according to the determined BPM;

Step 5: acquiring the classification result of the volume classifier by the MCU according to the determined acquisition frequency;

Step 6: controlling color change and/or brightness change of LED lamp on the music lamp strip according to the classification result acquired by the MCU.

Figure 2:
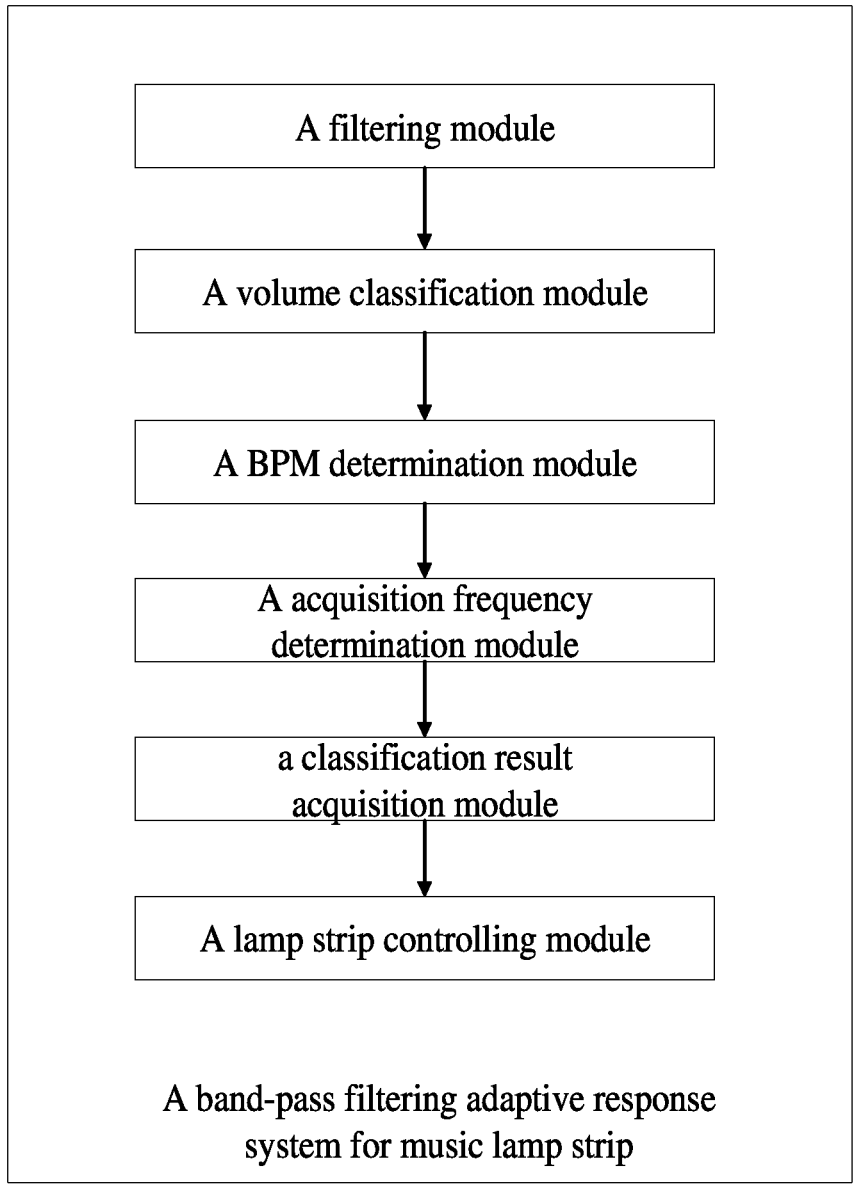
FIG. 2 is a structural block diagram of the band-pass filtering adaptive response method for music lamp strip provided by this present invention according to a specific embodiment.

Accordingly, as shown in FIG. 2, an embodiment of the present invention also discloses a band-pass filtering adaptive response system for music lamp strip, comprising:

a filtering module, configured to obtain sound data acquired by a microphone in real time, and sequentially filter the obtained sound data through a low-pass filter;

a volume classification module, configured to classify the filtered sound data by a volume classifier so as to classify the continuous changes of sound into a number of discrete classifications;

a BPM determination module, configured to determine a BPM of the sound data according to a classification result of the volume classifier;

a acquisition frequency determination module, configured to determine a acquisition frequency of a MCU according to the determined BPM;

a classification result acquisition module, configured for the MCU to acquire the classification result of the volume classifier according to the determined acquisition frequency;

a lamp strip controlling module, configured to control color change and/or brightness change of LED lamp on the music lamp strip according to the classification result acquired by the MCU.

In this implementation, the band-pass filtering adaptive response method for music lamp strip takes the band-pass filtering adaptive response for music lamp strip as the execution object of the step, or takes the component of the band-pass filtering adaptive response for music lamp strip as the execution object of the step. Specifically, step 1 takes the filtering module as the execution object of the step. Step 2 takes the volume classification module as the execution object of the step. Step 3 takes the BPM determination module as the execution object of the step. Step 4 takes the acquisition frequency determination module as the execution object of the step. Step 5 takes the classification result acquisition module as the execution object of the step. Step 6 takes the lamp strip controlling module as the execution object of the step.

In Step 1, firstly, the distribution of the audio frequency of most musical instruments is known for the persons skilled in the art. It can be seen that the frequencies of most musical instruments are below 1 KHz. However, the sound acquired by the microphone is not only the sound of playing music, but also contains various noises, such as the sound of talking in the car, the driving of the car, as well as tire noise, wind noise and other noises. According to statistics, when a person sings, the approximate audio frequency is as follows: the treble frequency range of the child's voice is 260-880 Hz, and the bass frequency range is 196-700 Hz; the treble frequency range of the female voice is 220-1.1 KHz, and the bass frequency range is 200-700 KHz; the treble frequency range of the male voice is 160-523 KHz and the bass frequency range is 80-358 Hz. The general frequency range of tire noise and wind noise is 500-1200 Hz. Therefore, in this embodiment of the present invention, most of the noise can be attenuated by designing a low-pass filter, and most of the data of the music part can be retained.

Specifically, the present invention filters the sound signal of the microphone through a low-pass filter with a cut-off frequency of 1 KHz, which can effectively attenuate most of the noise and retain most of the music data.

Further, in Step 2, classifying the filtered sound data utilizing a softMax function, wherein a mathematical expression of the softMax function is as follows:

$$S_i = e^{V_i} / \sum_j^C e^{V_j}$$

wherein, $V_i$, represents a output of the classifier, i represents a category index, C represents a total number of classifications, and $S_i$ represents a ratio of a index of a current element to a index sum of all elements, values of j range from 1, 2, 3 . . . C.

When the filtered sound data passes through the volume classifier formed by softMax function, the volume value of the sound data will be output in real time, so as to classify the continuous changes of sound into a number of discrete classifications. In this implementation, a large number of irregular sound signals are divided into 10 classifications by softMax function. For example, the output classification result of the volume classifier at one moment is 10, and the output classification result of the volume classifier at the next second is 1, so as to discretize the continuous changes of the sound.

In Step 3, determining a BPM of the sound data according to a classification result of the volume classifier, so that the MCU can control the change of music lamp strip according to the result of acquiring volume classifier through BPM, so that the change of music lamp strip can accurately match the rhythm of music.

Among them, BPM (Beat Per Minute) represents the playback rate of music, and specifically refers to the number of beats per minute to represent the playback speed of music. For example, the sound speed of an ordinary song is about 60 beats, that is, 60 beats of music will be played in one minute, then in Step 4, the MCU will convert the classification result of acquiring the volume classifier every 1 second; the rhythm obtained in this way will be extremely close to the rhythm of the real song, so that the change of the LED color matches the rhythm of the music. Of course, the BPM of a song will change, but this change will not be relatively large, so it can be considered that the BPM of a song is basically unchanged.

Specifically, Step 3 comprises following sub-steps:

Step 301: continuously acquiring the classification result output by the volume classifier for multiple times at a preset collection frequency, and determining a law of music rhythm change of the sound data according to the output classification result;

Step 302: increasing the acquisition frequency for multiple times, and repeating Step 301.

Step 303: determining a rhythm pattern of the sound data according to the law of music rhythm change corresponding to a corresponding acquisition frequency, and selecting a law of music rhythm change most consistent with the determined rhythm pattern; determining the BPM of music data according to a acquisition frequency corresponding to a most consistent law of music rhythm change.

Accordingly, the BPM determination module in the bandpass filtering adaptive response system for music lamp strip comprises:

a acquisition unit, configured to continuously acquire the classification result output by the volume classifier for multiple times at a preset collection frequency, and determine a law of music rhythm change of the sound data according to the output classification result;

a acquisition frequency setting unit, configured to set a acquisition frequency;

a BPM determination unit, configured to determine a rhythm pattern of the sound data according to the law of music rhythm change corresponding to a corresponding acquisition frequency, and select a law of music rhythm change most consistent with the determined rhythm pattern and configured to determine the BPM of music data according to a acquisition frequency corresponding to a most consistent law of music rhythm change.

Accordingly, in this embodiment, Step 3 takes the BPM determination module as the execution object of the step or the component of the BPM determination module as the execution object of the step. Specifically, Step 301 takes the acquisition unit as the execution object of step. Step 302 takes the acquisition frequency setting unit as the execution object of step, and Step 303 takes the BPM determination unit as the execution object of step.

In Step 301, as the BPM of the song will not be higher than 240, the preset collection frequency can be set to 0.25 s, that is, acquiring the classification result output by the volume classifier once every 0.25 s, and continuously acquiring the classification result output by the volume classifier for multiple times (such as 8 times), and recording the classification value output by the volume classifier each time. For example, the classification value of the volume classifier in the first time is 2. The classification value of the volume classifier in the second time is 6 . . . etc. The higher the classification value is, the higher the volume is. According to the classification value output by the volume classifier, the rhythm change rule of the music to be played can be determined.

Due to the inaccuracy of the result acquired for one time, in Step 302, it is necessary to increase the acquisition frequency for multiple times and repeat step 301. As the BPM of the song is not higher than 240, the acquisition frequency can be increased by a multiple of the preset collection frequency when the acquisition is carried out again. For example, the first acquisition frequency is 0.25 s.

The second acquisition frequency is 0.5 s, and the third acquisition frequency is 0.75 s . . . and the like.

Music is generally divided into: single beat, that is, only strong and weak changes, such as 2/2, 2/4, etc.; complex beat, the feature of complex beat is that in addition to strong beats and weak beats, there are secondary strong beats, such as 4/4, 6/8 etc. Therefore, according to the law of music rhythm change corresponding to the several acquisition frequencies obtained in steps 301-302, the rhythm pattern of the played music can be determined, that is, the most rhythm pattern can be the single beat pattern, the multiple beat pattern, etc., and then a law of music rhythm change most consistent with the determined rhythm pattern can be selected. The BPM of music data is determined according to a acquisition frequency corresponding to a most consistent law of music rhythm change. For example, when the acquisition frequency is 1 s, the law of music rhythm change presented at this time best matches the determined rhythm pattern. If the waveform changes of the two are basically the same, the acquisition frequency at this time is closest to the BPM of sound data. Therefore take the determined BPM at this time as the BPM of the sound data, the change effect of the LED lamp on the music lamp strip is closer to the rhythm change of the music.

In step 4, after the BPM of the sound data is determined, the acquisition frequency of the volume classifier acquired by the MCU can be determined. Specifically, it means when the playback speed of the sound data is determined, that is, the number of beats per minute of the music is determined. The MCU acquires the value in the volume classifier according to the playback speed. For example, when it is determined that the BPM of the played music is 60, that is, the music is played at 60 beats per minute. After mathematical conversion, it can be known that there is one beat every 1 second. So in Step 5, the MCU will convert the value of the volume classifier acquired every 1 second.

Further, Step 6 comprises following sub-steps:

Step 601: obtaining a value of a current volume classifier and a last volume classifier, and calculating a step value between the value of the current volume classifier and the last volume classifier;

Step 602: controlling the color change and/or the brightness change of the LED lamp on the music lamp according to the step value; wherein, the change of LED lamp color and LED lamp brightness correspond to the corresponding step value respectively.

Accordingly, the lamp strip controlling module in the band-pass filtering adaptive response system for music lamp strip comprises:

a step value determination unit, configured to obtain a value of a current volume classifier and a last volume classifier and calculate a step value between the value of the current volume classifier and the last volume classifier;

a lamp strip controlling unit, configured to control the color change and/or the brightness change of the LED lamp on the music lamp according to the step value; wherein, the change of LED lamp color and LED lamp brightness correspond to the corresponding step value respectively.

Accordingly, in this embodiment, step 6 takes the lamp strip controlling module as the execution object of the step, or the component of the lamp strip controlling module as the execution object of the step. Specifically, Step 601 takes the step value determination unit as the execution object of step, and Step 602 takes the lamp strip controlling unit as the execution object of step.

In step 6, the MCU acquires the data of the volume classifier according to the determined collection frequency, and determines whether the acquired data changes each time. And if there is a change, the color of the LED lamp will change accordingly. Specifically, the current volume classifier value and the last volume classifier value are obtained, and the step value between the value of the current volume classifier and the last volume classifier is calculated, and the MCU will control the color change and/or brightness change the music lamp strip according to the step value. Changes in color and/or brightness of LED lamp on the music lamp. Wherein, the larger the step value is, the larger the span of the brightness change of the LED amp and/or the color change frequency of the LED lamp is, so as to match the rhythm of the played music, and the user experience is better.

Among them, different BPM songs take different approaches. For songs above 90 BPM, due to the fast rhythm, if the LED lamp color changes too fast, it will make people feel uncomfortable. Therefore, for songs above 90 BPM, no matter how big the volume difference between strong and weak beats is, the color change step is the preset maximum step length, and the color change of LED lamp is the same. Of course, how different step values correspond to the changes of LED lamp color and LED lamp intensity belongs to the prior arts and will not be described here.

By reason of the foregoing, the present invention firstly uses a low-pass filter to remove some noises, such as wind noise, tire sound, human voice, etc., so as to attenuate most of the noise and retain most of the music part. Then the volume classifier is used to classify the acquired sound data in real time, and determine the BPM of the sound data, so as to determine the acquisition frequency of the MCU according to the BPM. Finally, the present invention control the color change and/or brightness change of LED lamp on the music lamp according to the classification result acquired by the MCU. Because the present invention firstly determines the BPM of the sound data, and then determines the acquisition frequency of the MCU according to the BPM, the changes of the music lamp strip behind can accurately match the rhythm of the music, thereby improving the user experience.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

The invention claimed is:

1. A band-pass filtering adaptive response method for music lamp strip, comprising following steps:
   Step 1: obtaining sound data acquired by a microphone in real time, and sequentially filtering the obtained sound data through a low-pass filter;
   Step 2: classifying the filtered sound data by a volume classifier, so as to classify the continuous changes of sound into a number of discrete classifications;
   Step 3: determining a beats per minute (BPM) of the sound data according to a classification result of the volume classifier;
   Step 4: determining an acquisition frequency of a microcontroller (MCU) according to the determined BPM;
   Step 5: acquiring the classification result of the volume classifier by the MCU according to the determined acquisition frequency;

Step 6: controlling color change and/or brightness change of a light emitting diode (LED) lamp on the music lamp strip according to the classification result acquired by the MCU.

2. The band-pass filtering adaptive response method for music lamp strip according to claim 1, wherein a cut-off frequency of the low-pass filter is 1 KHz.

3. The band-pass filtering adaptive response method for music lamp strip according to claim 1, wherein,
in Step 2, classifying the filtered sound data utilizing a softMax function, wherein a mathematical expression of the softMax function is as follows:

$$S_i = e^{V_i} / \sum_{j}^{C} e^{V_j}$$

wherein, $V_i$ represents a output of the classifier, i represents a category index, C represents a total number of classifications, and $S_i$ represents a ratio of a index of a current element to a index sum of all elements, values of j range from 1, 2, 3 . . . C.

4. The band-pass filtering adaptive response method for music lamp strip according to claim 1, wherein Step 3 comprises following sub-steps:
Step 301: continuously acquiring the classification result output by the volume classifier for multiple times at a preset collection frequency, and determining a law of music rhythm change of the sound data according to the output classification result;
Step 302: increasing the acquisition frequency for multiple times, and repeating Step 301;
Step 303: determining a rhythm pattern of the sound data according to the law of music rhythm change corresponding to a corresponding acquisition frequency, and selecting a law of music rhythm change most consistent with the determined rhythm pattern; determining the BPM of music data according to a acquisition frequency corresponding to a most consistent law of music rhythm change.

5. The band-pass filtering adaptive response method for music lamp strip according to claim 1, wherein, Step 6 comprises following sub-steps:
Step 601: obtaining a value of a current volume classifier and a last volume classifier, and calculating a step value between the value of the current volume classifier and the last volume classifier;
Step 602: controlling the color change and/or the brightness change of the LED lamp on the music lamp according to the step value; wherein, the change of LED lamp color and LED lamp brightness correspond to the corresponding step value respectively.

6. A band-pass filtering adaptive response system for music lamp strip, comprising:
a filtering module, configured to obtain sound data acquired by a microphone in real time, and sequentially filter the obtained sound data through a low-pass filter;
a volume classification module, configured to classify the filtered sound data by a volume classifier so as to classify the continuous changes of sound into a number of discrete classifications;
a beats per minute (BPM) determination module, configured to determine a BPM of the sound data according to a classification result of the volume classifier;
an acquisition frequency determination module, configured to determine a acquisition frequency of a microcontroller (MCU) according to the determined BPM;
a classification result acquisition module, configured for the MCU to acquire the classification result of the volume classifier according to the determined acquisition frequency;
a lamp strip controlling module, configured to control color change and/or brightness change of a light emitting diode (LED) lamp on the music lamp strip according to the classification result acquired by the MCU.

7. The band-pass filtering adaptive response system for music lamp strip according to claim 6, wherein
the volume classification module classifies the filtered sound data utilizing a softMax function, wherein a mathematical expression of the softMax function is as follows:

$$S_i = e^{V_i} / \sum_{j}^{C} e^{V_j}$$

wherein, $V_i$ represents a output of the classifier, i represents a category index, C represents a total number of classifications, and $S_i$ represents a ratio of a index of a current element to a index sum of all elements, values of j range from 1, 2, 3 . . . C.

8. The band-pass filtering adaptive response system for music lamp strip according to claim 6, wherein the BPM determination module comprises:
a acquisition unit, configured to continuously acquire the classification result output by the volume classifier for multiple times at a preset collection frequency, and determine a law of music rhythm change of the sound data according to the output classification result;
a acquisition frequency setting unit, configured to set a acquisition frequency;
a BPM determination unit, configured to determine a rhythm pattern of the sound data according to the law of music rhythm change corresponding to a corresponding acquisition frequency, and select a law of music rhythm change most consistent with the determined rhythm pattern and configured to determine the BPM of music data according to a acquisition frequency corresponding to a most consistent law of music rhythm change.

9. The band-pass filtering adaptive response system for music lamp strip according to claim 6, wherein the lamp strip controlling module comprises:
a step value determination unit, configured to obtain a value of a current volume classifier and a last volume classifier and calculate a step value between the value of the current volume classifier and the last volume classifier;
a lamp strip controlling unit, configured to control the color change and/or the brightness change of the LED lamp on the music lamp according to the step value; wherein, the change of LED lamp color and LED lamp brightness correspond to the corresponding step value respectively.

* * * * *